US012759637B2

(12) United States Patent
Nagasawa

(10) Patent No.: US 12,759,637 B2

(45) Date of Patent: Oct. 13, 2026

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 330 days.

(21) Appl. No.: 18/762,093

(22) Filed: Jul. 2, 2024

(65) Prior Publication Data

US 2025/0026408 A1 Jan. 23, 2025

(30) Foreign Application Priority Data

Jul. 18, 2023 (JP) ................................ 2023-116808

(51) Int. Cl.

*B60K 11/04* (2006.01)
*B62D 21/11* (2006.01)
*B62D 21/15* (2006.01)

(52) U.S. Cl.

CPC ............ *B62D 21/155* (2013.01); *B60K 11/04* (2013.01); *B62D 21/11* (2013.01)

(58) Field of Classification Search

CPC ..... B62D 21/155; B62D 21/152; B62D 21/15
USPC ............................ 296/187.09, 203.02, 187.1
See application file for complete search history.

(56) References Cited

U.S. PATENT DOCUMENTS 10,071,772 B2 * 9/2018 Sasaki .................. B62D 21/155
2020/0114971 A1 4/2020 Kobayashi et al.

FOREIGN PATENT DOCUMENTS

JP 2022-504969 A 1/2022
KR 20080054895 A * 12/2006 ........... B62D 21/152
WO WO 2014162573 A1 * 10/2014 ........... B62D 21/152

OTHER PUBLICATIONS

KR 20080054895 A original and translation (Year: 2008).*
WO 2014162573 A1 original and translation (Year: 2014).*

* cited by examiner

*Primary Examiner* — Amy R Weisberg
*Assistant Examiner* — Gabrie Richard Sackinger
(74) *Attorney, Agent, or Firm* — Smith, Gambrell & Russell, LLP

(57) ABSTRACT

A vehicle body front structure includes a cradle, a front side frames in a pair, a radiator support, a control plate, and a beam member. The cradle is disposed below a power unit room disposed in a front portion of a vehicle body. The front side frames extend on a side portion of the power unit room. The radiator support is provided in front of the power unit room and joins a front end of each front side frame to a radiator side frame. The control plate is joined to an outer surface of the front end of each front side frame and the radiator side frame. The beam member is disposed in a vehicle body front space and includes an arc portion having a center portion, and a winding portion joined to the control plate and provided at each of both ends of the arc portion.

6 Claims, 6 Drawing Sheets

VEHICLE BODY FRONT STRUCTURE

CROSS-REFERENCE TO RELATED APPLICATIONS

The present application claims priority from Japanese Patent Application No. 2023-116808 filed on Jul. 18, 2023, the entire contents of which are hereby incorporated by reference.

BACKGROUND

The present disclosure relates to a vehicle body front structure that controls deformation of a vehicle body front portion at the time of collision.

In recent years, in a vehicle body structure of an automobile or the like, a structure employing a cradle structure, which is a parallel cross structure, is well known. Such a cradle structure improves assembly workability in a production line, and also serves as a collision energy absorbing member at the time of a frontal collision by being provided in a front portion of a vehicle body.

For example, Japanese Unexamined Patent Application Publication (Translation of PCT Application) No. 2022-504969 discloses a vehicle front end structure that is a front structure of a vehicle having an engine cradle. In a conventional vehicle front end structure, a force receiving structure configured to pivot on its force receiving surface in response to a crash event is attached to an engine cradle.

SUMMARY

An aspect of the disclosure provides a vehicle body front structure. The vehicle body front structure includes a cradle, front side frames in a pair, a radiator support, a control plate, and a beam member. The cradle is disposed below a power unit room disposed in a front portion of a vehicle body and supports a power unit. The front side frames extend in a front-rear direction of the vehicle body on a side portion of the power unit room. The radiator support is provided in front of the power unit room and joins a front end of each of the front side frames to a radiator side frame. The control plate is joined to an outer surface of the front end of each of the front side frames and the radiator side frame. The beam member is disposed in a vehicle body front space formed between the power unit room and the radiator support. The beam member includes an arc portion having a center portion fixed to the cradle, and a winding portion joined to the control plate and provided at each of both ends of the arc portion.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

A conventional front structure of a vehicle is arranged in such a manner that the cradle structure bypasses a reciprocating engine or the like, which is a power unit of the internal combustion engine. Thus, the conventional front structure of the vehicle may be limited and insufficient as an energy absorbing member at the time of a frontal collision.

On the other hand, in an electric vehicle, a power unit such as a motor is smaller than a reciprocating engine. For this reason, a space is generated in a front portion of the vehicle body, and a cradle structure that alleviates an impact at the time of a full-wrap frontal collision and sufficiently ensures a crash stroke is required.

However, at the time of a small overlap frontal collision, a large collision load locally acts on one side region of the front surface of the vehicle body. Thus, it may be difficult to sufficiently absorb the collision load.

As described above, in the case of the small overlap frontal collision, it is difficult to sufficiently suppress deformation of the power unit room. As a result, it is more difficult for a vehicle body front structure for an electric vehicle to sufficiently suppress deformation of the power unit room.

It is desirable to provide a vehicle body front structure capable of suppressing deformation of a power unit room in any collision of a full-wrap frontal collision and a small overlap frontal collision.

Figure 1:
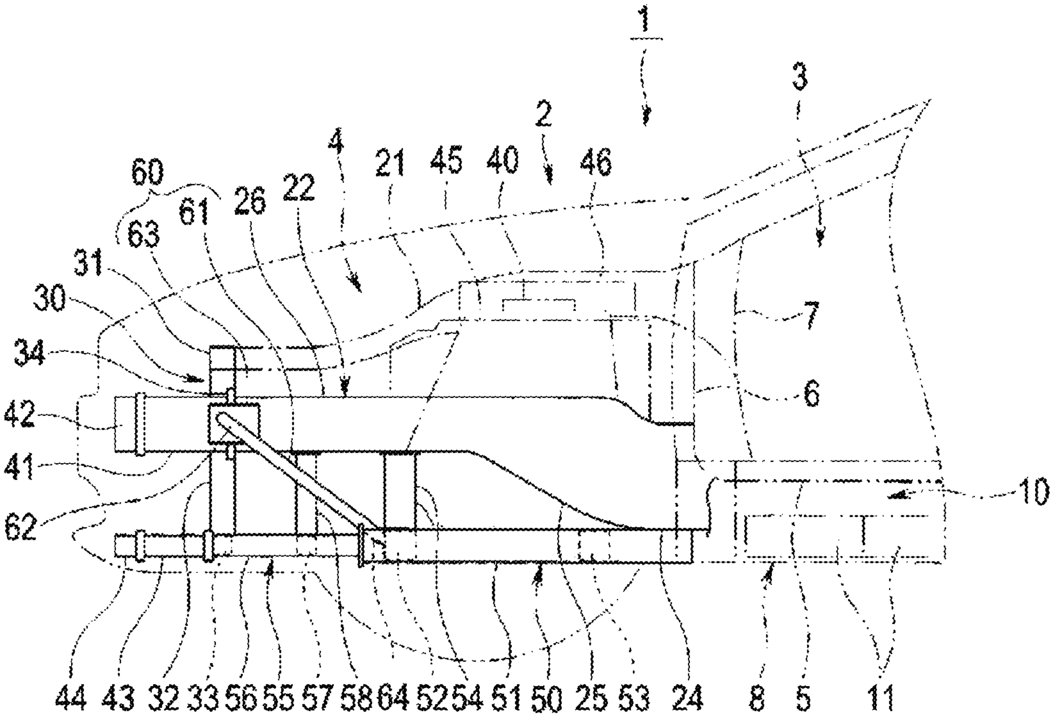
FIG. 1 is a side view illustrating a main part of a vehicle body front structure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. As illustrated in FIG. 1, a vehicle 1 includes a cabin 3 and a motor room 4 in a vehicle body 2. Note that the vehicle 1 here is exemplified by an electric vehicle. Further, the motor room 4 constitutes a power unit room provided in the front portion of the vehicle body 2.

The cabin 3 is provided substantially at the center portion of the vehicle body 2 in a front-rear direction. In the cabin 3, a vehicle body frame is formed by the floor panel 5, a toe board 6, a pair of left and right front pillars 7, and a pair of left and right side sills 8.

The floor panel 5 is formed by, for example, a substantially flat plate-shaped sheet metal member. The floor panel 5 constitutes a floor surface of the cabin 3. A battery chamber 10 is disposed below the floor panel 5. Batteries 11 are accommodated in the battery chamber 10.

The toe board 6 is formed by, for example, a sheet metal member standing upward from a front end of the floor panel 5. The toe board 6 constitutes a partition wall that partitions the cabin 3 and the motor room 4.

The pair of side sills 8 is, for example, a hollow member having a closed cross-sectional shape. Each side sill 8 is formed by, for example, joining panels. Each side sill 8 extends in the front-rear direction of the vehicle body 2 on left and right side portions of the floor panel 5. Further, each side sill 8 is joined to left and right side portions of the floor panel 5.

The pair of front pillars 7 is, for example, a hollow member having a closed cross-sectional shape. Each front pillar 7 is formed by joining panels, for example. A lower end of each front pillar 7 is joined to a front end of each side sill 8. Each front pillar 7 is joined to left and right sides of the toe board 6.

The motor room 4 is disposed in front of the cabin 3. The motor room 4 is formed by a vehicle body frame surrounded by a pair of left and right upper side frames 21, a pair of left and right front side frames 22, and a cradle 50.

The pair of upper side frames 21 is formed by a sheet metal, for example. A front end of each upper side frame 21 is joined to a radiator support 30. A rear end of each upper side frame 21 is joined to each front pillar 7. In this manner, the upper side frames 21 extend in the front-rear direction of the vehicle body 2 above the left and right sides of the motor room 4.

The pair of front side frames 22 is, for example, a hollow member having a closed section rectangular shape. Each front side frame 22 is formed by joining panels, for example. Each front side frame 22 has a rear region 24, an inclined region 25, and a front region 26 in order along a longitudinal direction from the rear side to the front side.

The rear region 24 extends substantially horizontally toward the front of the vehicle body 2. A rear end of the rear region 24 is joined to the front end of each side sill 8 with, for example, a torque box (not illustrated) interposed therebetween. In this way, the rear region 24 transmits an impact load transmitted from the front of the vehicle body 2 to the side sill 8 at the time of the frontal collision of the vehicle 1.

The inclined region 25 is inclined at a predetermined elevation angle from the front end of the rear region 24 toward the front of the vehicle body 2. The front region 26 extends substantially horizontally from a front end of the inclined region 25 toward the front side of the vehicle body 2.

A strut tower 40 (suspension tower) is provided between each upper side frame 21 and each front side frame 22. A part of each strut tower 40 is formed permanently integrally with each upper side frame 21 and each front side frame 22. Each strut tower 40 is a vehicle body front frame that is set to have high rigidity and high strength and fixes a suspension.

Figure 2:
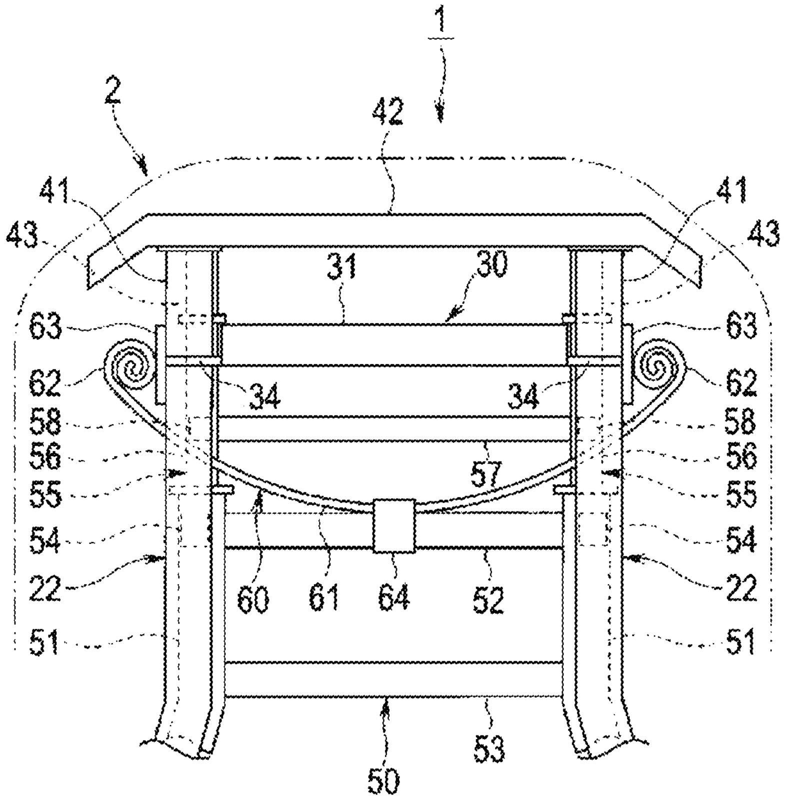
FIG. 2 is a plan view illustrating the main part of the vehicle body front structure.

As illustrated in FIGS. 1 and 2, the cradle 50 provided in a lower portion of the motor room 4 is, for example, a frame having a parallel-cross shape in which a pair of left and right lower side frames 51, a front cross member 52, and a rear cross member 53 are combined.

The pair of lower side frames 51 is, for example, a hollow member having a closed section rectangular shape. Each lower side frame 51 is formed by joining panels, for example. Each lower side frame 51 extends in the front-rear direction of the vehicle body 2.

As illustrated in FIG. 2, each lower side frame 51 is set in such a manner that, for example, an interval in a vehicle width direction is narrower than an interval between the pair of front side frames 22. Further, each lower side frame 51 is disposed in such a manner that a part of an outer region in a vehicle width direction overlaps a lower side of each front side frame 22 in top view.

Note that a suspension arm (not illustrated) is connected to an outer surface of each lower side frame 51 in the vehicle width direction. Each suspension arm is disposed on the cradle 50 so as to be swingable in a vertical direction.

The front cross member 52 and the rear cross member 53 are, for example, hollow members having a closed cross-sectional shape. The front cross member 52 and the rear cross member 53 are formed by joining panels, for example. The front cross member 52 and the rear cross member 53 extend in the vehicle width direction at a predetermined interval in the front-rear direction of the vehicle body.

Both left and right ends of the front cross member 52 and the rear cross member 53 are joined to a middle of each lower side frame 51. Thus, the cradle 50 formed by each lower side frame 51, the front cross member 52, and the rear cross member 53 supports a power unit 45 such as a motor and a control unit 46 on the vehicle body 2.

As illustrated in FIG. 1, the cradle 50 configured as described above is joined to a lower portion of each front side frame 22. For example, a rear region of each lower side frame 51 constituting the cradle 50 is joined to the rear region 24 of each front side frame 22.

Further, a front end of each lower side frame 51 is joined to the front region 26 of each front side frame 22 with a columnar reinforcing member 54 interposed therebetween. The reinforcing member 54 extends in the vertical direction and has, for example, a prismatic shape.

The position of the front end of the cradle 50 coincides with a front end position of the structural portion of the strut tower 40, and each lower side frame 51 is joined to the strut tower 40. Note that the reinforcing member 54 is also preferably joined to the strut tower 40.

A cradle extension 55 is provided in front of the cradle 50. The cradle extension 55 is a frame in which a pair of left and right lower side frames 56 and a cross member 57 are combined.

The pair of lower side frames 56 is, for example, a hollow member having a closed cross-sectional shape. Each lower side frame 56 is formed by joining panels, for example. Each lower side frame 56 extends in the front-rear direction of the vehicle body 2.

Each lower side frame 56 is joined to the front end of the lower side frame 51 of the cradle 50. Each lower side frame 56 is disposed in such a manner that a part of an outer region in the vehicle width direction overlaps a lower side of each front side frame 22 in top view.

The cross member 57 is, for example, a hollow member having a closed cross-sectional shape. The cross member 57 is formed by, for example, joining panels. Both left and right ends of the cross member 57 are joined to a middle of each lower side frame 56.

Further, a middle portion of each lower side frame 56 is joined to the front region 26 of each front side frame 22 with the columnar reinforcing member 58 interposed therebetween. The reinforcing member 58 extends in the vertical direction and has, for example, a prismatic shape.

In this manner, the cradle 50 and the cradle extension 55 are joined to each front side frame 22. In addition, each lower side frame 51 of the cradle 50 is set to have a length longer than a length necessary for supporting the power unit 45 and the control unit 46 in each front region.

Each lower side frame 56 of the cradle extension 55 has a front end disposed at substantially the same front-rear position of the vehicle body as a front end of each front side frame 22. That is, in the cradle extension 55, each lower side frame 56 extends to the front side of the vehicle body from the cross member 57.

The radiator support 30 is attached to an inner side of a front end of each lower side frame 56. The radiator support 30 includes a radiator upper frame 31, a pair of left and right radiator side frames 32, and a radiator lower frame 33. The radiator support 30 is a frame body for supporting a radiator core (not illustrated) in a front portion of the motor room 4.

Each of the radiator upper frame 31 and the radiator lower frame 33 extends in the vehicle width direction. Both side portions of the radiator upper frame 31 are joined to upper ends of the pair of radiator side frames 32. Both side portions of the radiator lower frame 33 are joined to lower ends of the pair of radiator side frames 32. That is, both left and right ends of each of the radiator upper frame 31 and the radiator lower frame 33 are coupled to each other with the pair of radiator side frames 32 interposed therebetween.

The left and right ends of the radiator lower frame 33 are joined to the front ends of the lower side frames 56. Thus, the cradle 50, the cradle extension 55, and the radiator lower frame 33 form what is called a ladder structure.

Each radiator side frame 32 has a bracket 34. Each bracket 34 is, for example, a flat plate member extending outward in the vehicle width direction. The front end of each front side frame 22 is joined to a rear surface of each bracket 34.

Further, a first crash box 41 protruding forward from the vehicle body 2 is joined to a front face of each bracket 34. Each first crash box 41 is disposed at an extended position forward from each bracket 34 and continuous with each front side frame 22. A bumper beam 42 extending in the vehicle width direction is joined to a front end of each first crash box 41.

Further, a second crash box 43 is joined to a front end of each lower side frame 56 of the cradle extension 55. A lip spoiler 44 extending in the vehicle width direction is joined to a front end of each second crash box 43.

The vehicle 1 includes a beam member 60 as a beam structure extending from the cradle 50 to the radiator side frames 32 as a vehicle body front structure, which is the main part of the present embodiment. The beam member 60 is disposed in a vehicle body front space formed above the cradle extension 55 disposed from a front end of the cradle 50 positioned below the motor room 4 to the radiator side frames 32. That is, the vehicle body front space is a space formed between the motor room 4 and the radiator support.

More specifically, as illustrated in FIG. 2, the beam member 60 includes an arc portion 61, winding portions 62 formed at both ends of the arc portion 61, and a control plate 63. The beam member 60 is a hollow long member in which a metal pipe or the like is formed in an arcuate shape. Note that the beam member 60 may be a solid long member in which a metal rod or the like is formed in an arcuate shape. Each winding portion 62 provided at both ends of the arc portion 61 is formed in a spiral shape of an involute curve from the outside to the inside.

A center portion of the arc portion 61 is fixed to the front cross member 52 of the cradle 50 by a fixing member 64 such as a clamp. The control plate 63, which is a metal plate, is joined to an outer surface of an inside of each winding portion 62.

Each winding portion 62 is joined in such a manner that the entire winding portion is positioned behind a front end of the control plate 63. That is, the control plate 63 has a length in the front-rear direction extending to the front side of the vehicle body 2 with respect to the winding portion 62. Each winding portion 62 and each control plate 63 are point-joined by welding or the like. Note that a fixing member such as a bolt or a clamp may be used to join each winding portion 62 and each control plate 63.

The control plate 63 is joined to the radiator side frame 32 and the front side frame 22 so as to be independently slidable to rearward of the radiator side frame 32 and the front side frame 22 to some extent (slightly) by a predetermined distance (length). For example, each control plate 63 is joined to an outer surface in the vehicle width direction over a front end of the front region 26 of the front side frame 22 so as to cover the bracket 34 of the radiator side frame 32.

For example, an embodiment may be employed in which a long hole is formed in the control plate 63, and a bolt is passed through the long hole and be fastened to the radiator side frame 32 and the front side frame 22, so that the control plate 63 is independently slidable backward to some extent.

Note that an embodiment may be employed in which a guide rail or the like for slidably holding the control plate 63 is provided on the outer surface of each front side frame 22, and the control plate 63 is independently slidable backward to some extent.

In this manner, a center of the arc portion 61 of the beam member 60 is fixed to the front cross member 52 of the cradle 50 by the fixing member 64. Then, the winding portions 62 at both ends of the beam member 60 are each joined to outer surfaces of the radiator side frame 32 and the front side frame 22 with the control plate 63 interposed therebetween in such a manner as to be slidable to rearward of the radiator side frame 32 and the front side frame 22 to some extent.

In this state, as illustrated in FIGS. 1 and 2, in the beam member 60, each winding portion 62 on the front side is located on an upper side, and the center of the arc portion 61 on the rear side is located on a lower side. That is, the beam member 60 is installed so as to expand in an arc shape from the center of the vehicle width toward the outside of the vehicle width and to incline upward toward the front.

Further, the beam member 60 is disposed in such a manner that the arc portion 61 passes between each of the reinforcing members 54 joined to the cradle 50 and each of the reinforcing members 58 joined to the cradle extension 55. The beam member 60 is connected to the outer surfaces of the radiator side frames 32 and the front side frames 22 with the control plate 63 interposed therebetween. That is, the beam member 60 is disposed in such a manner that the arc portion 61 intersects with each of the front side frames 22.

Next, an operation of the front structure of the vehicle 1 configured as described above at the time of a full-wrap frontal collision of the vehicle body 2 will be described. In the following description, for example, a wall-like obstacle 100 is exemplified as a collision object, but the embodiment is not limited thereto, and is also applied to various collision objects such as other vehicles.

Figure 3:
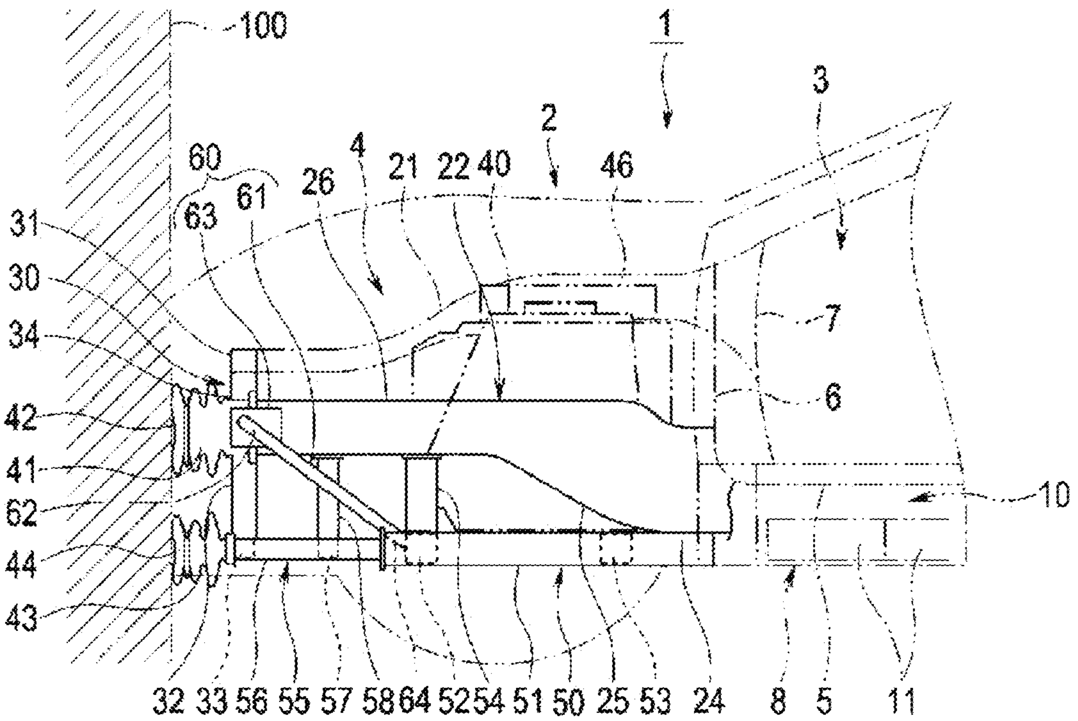
FIG. 3 is a side view illustrating a behavior of the vehicle body front structure at an initial stage at a time of a full-wrap frontal collision.

For example, as illustrated in FIG. 3, at an initial stage of the full-wrap frontal collision, each first crash box 41 and bumper beam 42 are crushed (buckled and deformed) by the impact of the wall-like obstacle 100. At the same time, each second crash box 43 and the lip spoiler 44 are crushed (buckled and deformed) by the impact of the wall-like obstacle 100. Note that in the case of the full-wrap frontal collision at a vehicle speed of about 20 km/h, the first crash box 41, the bumper beam 42, the second crash box 43, and the lip spoiler 44 are crushed to absorb impact.

Figure 4:
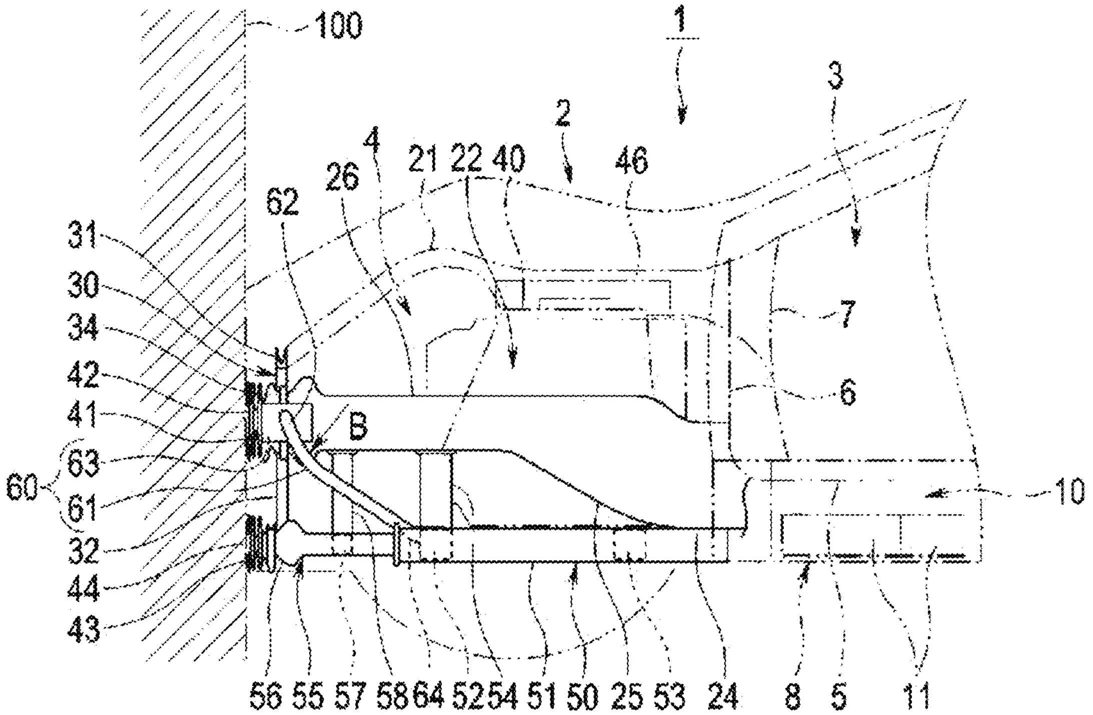
FIG. 4 is a side view illustrating a behavior of the vehicle body front structure at a middle stage at the time of the full-wrap frontal collision.

At a subsequent middle stage of the collision, for example, as illustrated in FIG. 4, crushing of the front region 26 of each front side frame 22 and the front region of each lower side frame 56 of the cradle extension 55 starts.

Figure 5:
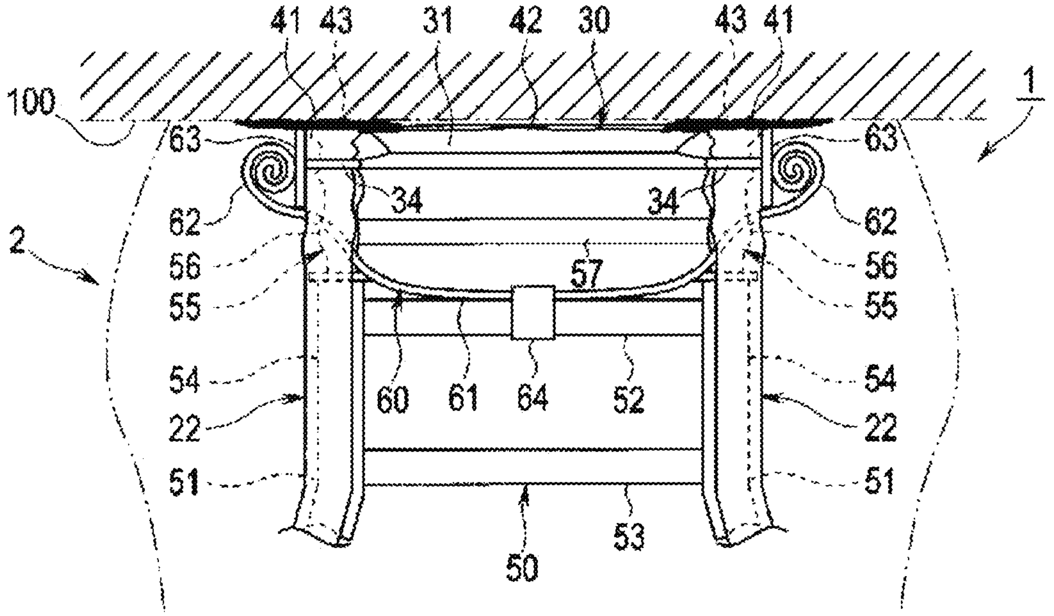
FIG. 5 is a plan view illustrating a behavior of the vehicle body front structure at the middle stage at the time of the full-wrap frontal collision.

As illustrated in FIG. 5, when each first crash box 41 and each second crash box 43 are crushed completely, a collision load is input to the control plate 63. That is, each of the first crash boxes 41 and each of the second crash boxes 43 are crushed and no longer crushed. Then, crushing of the radiator support 30 and crushing of the front region of the lower side frame 56 of the cradle extension 55 start. In the crushing process, the collision load is transmitted to each control plate 63.

At this time, each control plate 63 starts to retreat independently by a slightly predetermined distance with respect to the radiator side frame 32 and each front side frame 22. Each control plate 63 is strong against deformation of the vehicle body 2 in the front-rear direction, and starts to retreat as it is when receiving the collision load.

Figure 6:
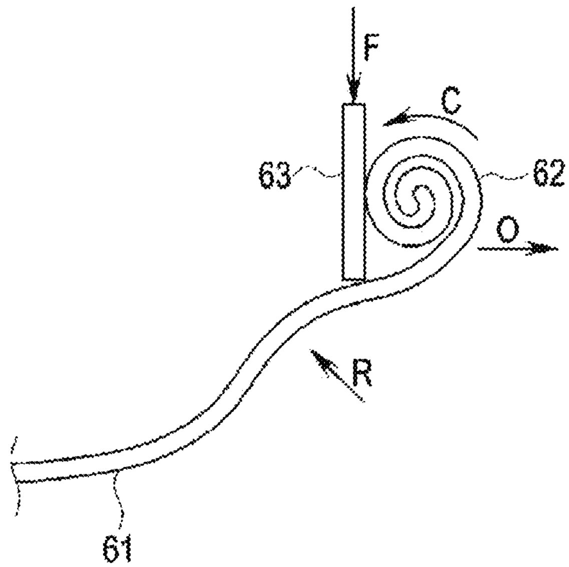
FIG. 6 is a schematic view for describing a behavior of a beam member at the middle stage at the time of the full-wrap frontal collision.

Each winding portion 62 joined to the control plate 63 starts to be wound and deformed inward as the control plate 63 moves backward. For example, as illustrated in FIG. 6, when the control plate 63 retreats by the input of the collision load (direction of arrow F), the winding portion 62 is wound and deformed toward the center side (direction of arrow C) because of having a spiral shape of an involute curve. At this time, a biasing force to expand in an outer peripheral direction is generated, and the winding portion 62 attempts to deform in a direction of swelling outward in the vehicle width direction (direction of arrow O).

Furthermore, when the winding portion 62 retreats together with the control plate 63 due to the input of the collision load, the arc portion 61 undergoes swelling deformation (curved deformation) so as to be pushed forward while absorbing the impact load (direction of arrow R). That is, although the arc portion 61 attempts to expand outward in the vehicle width direction, since the winding portions 62 provided at both ends are joined to the retreating control plate 63, deformation to the outside in the vehicle width direction is suppressed.

At the same time, tension is generated in the arc portion 61 in the direction of each of the winding portions 62 by the swelling deformation generated by the winding deformation of each of the winding portions 62. Further, when the winding portion 62 retreats together with the control plate 63, the distance between the arc portion 61 and the winding portion 62 from the position where the arc portion is fixed to the front cross member 52 decreases, and a portion near each winding portion 62 is deformed so as to be pushed out in the forward diagonal direction. Thus, the beam member 60 absorbs an impact load.

Note that, although only the arc portion 61, the winding portion 62, and the control plate 63 on the right side are illustrated and described in FIG. 6, deformation of the arc portion 61 and the winding portion 62 on the left side and the control plate 63 are also in a similar state.

Further, as illustrated in FIG. 4, since the arc portion is inclined upward toward the front side from the position where the arc portion 61 is fixed to the front cross member 52, when each winding portion 62 retreats together with the control plate 63, the vicinity of each winding portion 62 undergoes swelling deformation (curved deformation) so as to be pushed out also toward the front side (direction of arrow B).

Figure 7:
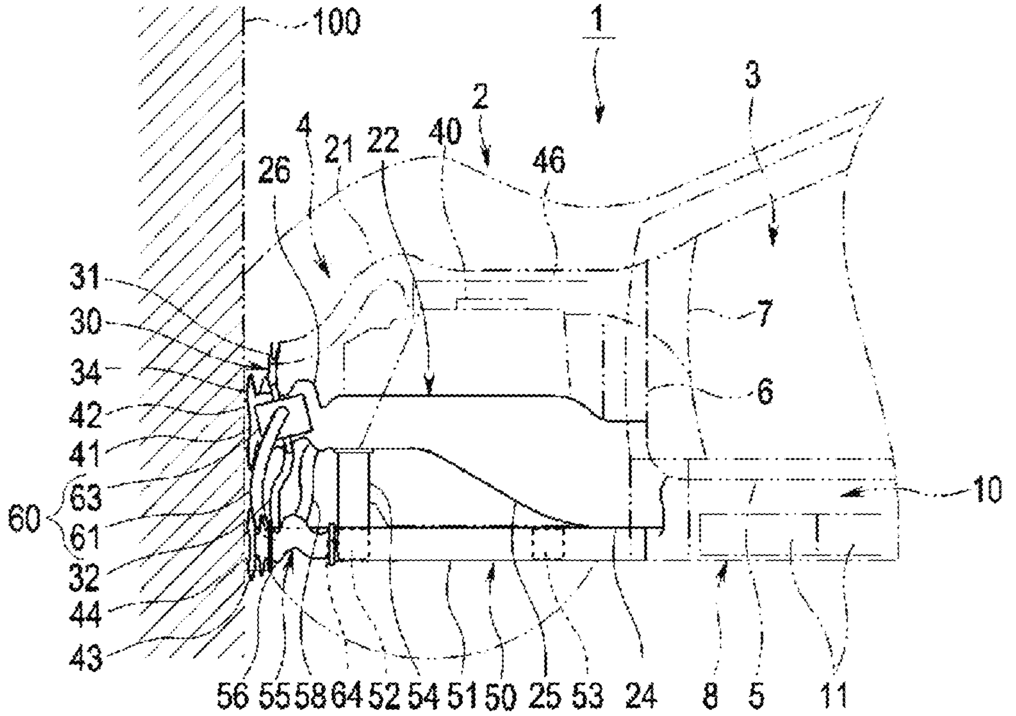
FIG. 7 is a side view illustrating a behavior of the vehicle body front structure at a final stage of the full-wrap frontal collision.

At a subsequent final stage of the collision, for example, as illustrated in FIG. 7, crushing of each front side frame 22 and each lower side frame 56 progresses. In this state, the rear portion of each lower side frame 51 joined to the rear portion of each lower side frame 56 is connected to each front side frame 22. Note that the beam member 60 is deformed in such a manner that the arc portion 61 is finally bent while absorbing the impact load.

Further, the front end of each lower side frame 51 is connected to each front side frame 22 with the reinforcing member 54 interposed therebetween. Thus, each lower side frame 51 generates a reaction force in the front region of the motor room 4 without retreating to the rear side of the vehicle body 2 at the time of the front collision. In this manner, each lower side frame 51 of the cradle 50 cooperates with each front side frame 22 to suppress deformation of the motor room 4.

Next, operation of the front structure of the vehicle 1 at a time of a small overlap frontal collision of the vehicle body 2 will be described.

Figure 8:
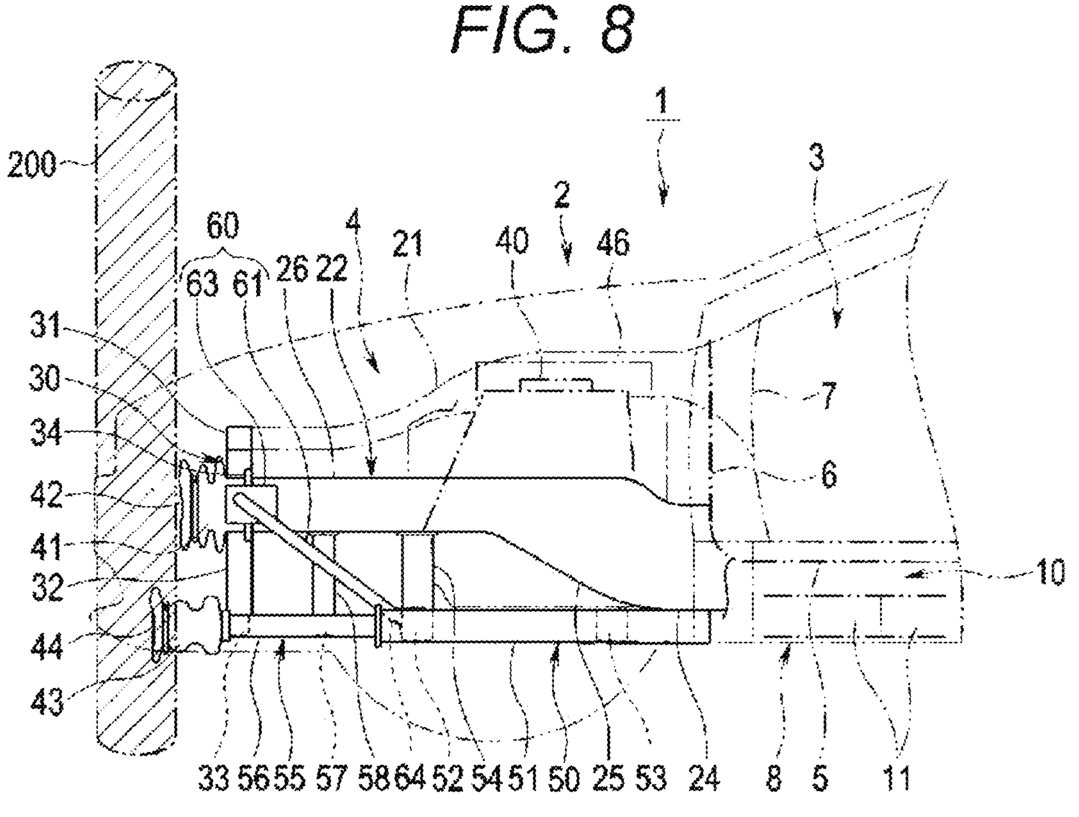
FIG. 8 is a side view illustrating a behavior of the vehicle body structure at an initial stage at a time of a small overlap frontal collision.
Figure 9:
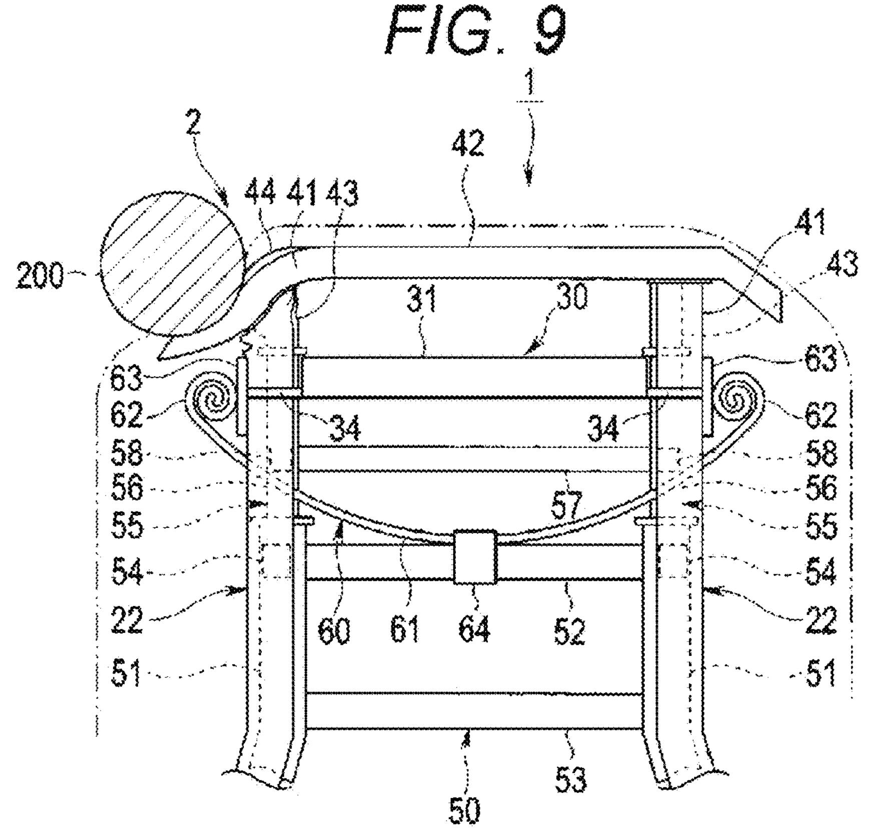
FIG. 9 is a plan view illustrating a behavior of the vehicle body structure at the initial stage at the time of the small overlap frontal collision.

For example, as illustrated in FIGS. 8 and 9, at an initial stage of a small overlap frontal collision, the first crash box 41 and the bumper beam 42 on the side impacted by an obstacle 200, such as a pole, are crushed.

At the same time, the second crash box 43 and the lip spoiler 44 on the side impacted by an obstacle 200, such as a pole, are crushed.

Note that the second crash box 43 is disposed inside the first crash box 41 in the vehicle width direction. Therefore, depending on the collision position of the obstacle 200, an amount of crushing of the first crash box 41 differs from an amount of crushing of the second crash box 43. In the examples illustrated in FIGS. 8 and 9, the amount of crushing of the second crash box 43 is relatively smaller than the amount of crushing of the first crash box 41.

Figure 10:
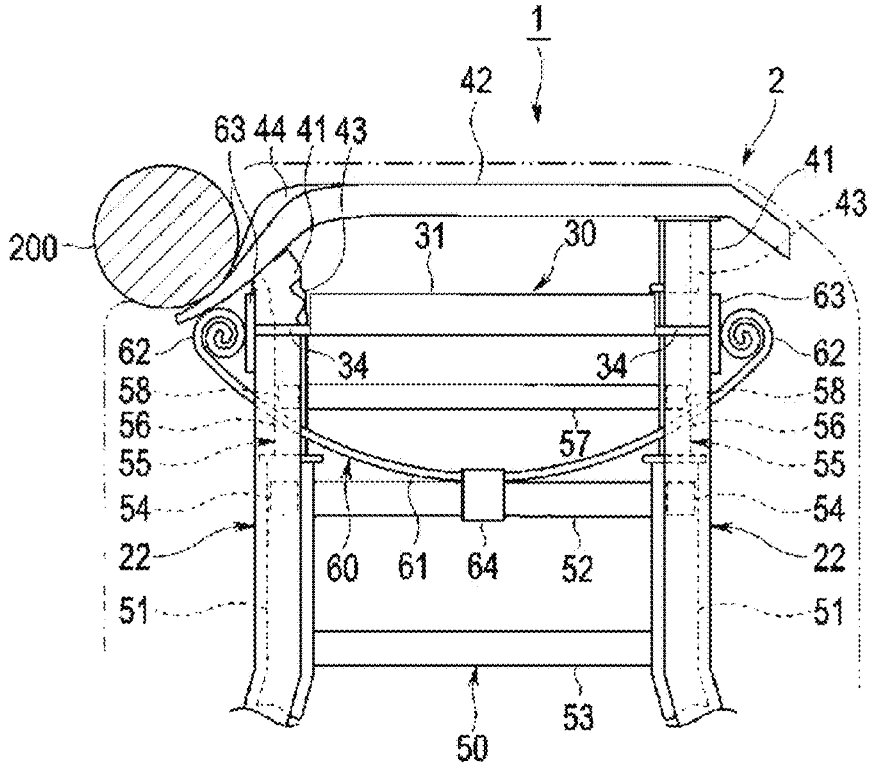
FIG. 10 is a plan view illustrating behavior of the vehicle body structure at a middle stage at the time of the small overlap frontal collision.

At a subsequent middle stage of the collision, for example, as illustrated in FIG. 10, crushing of side ends of the bumper beam 42 and the lip spoiler 44 and crushing of the first crash box 41 and the second crash box 43 proceed. At this time, the obstacle 200 reaches one of the beam members 60 provided on the outer surface of the front side frame 22, here, near the left winding portion 62.

Figure 11:
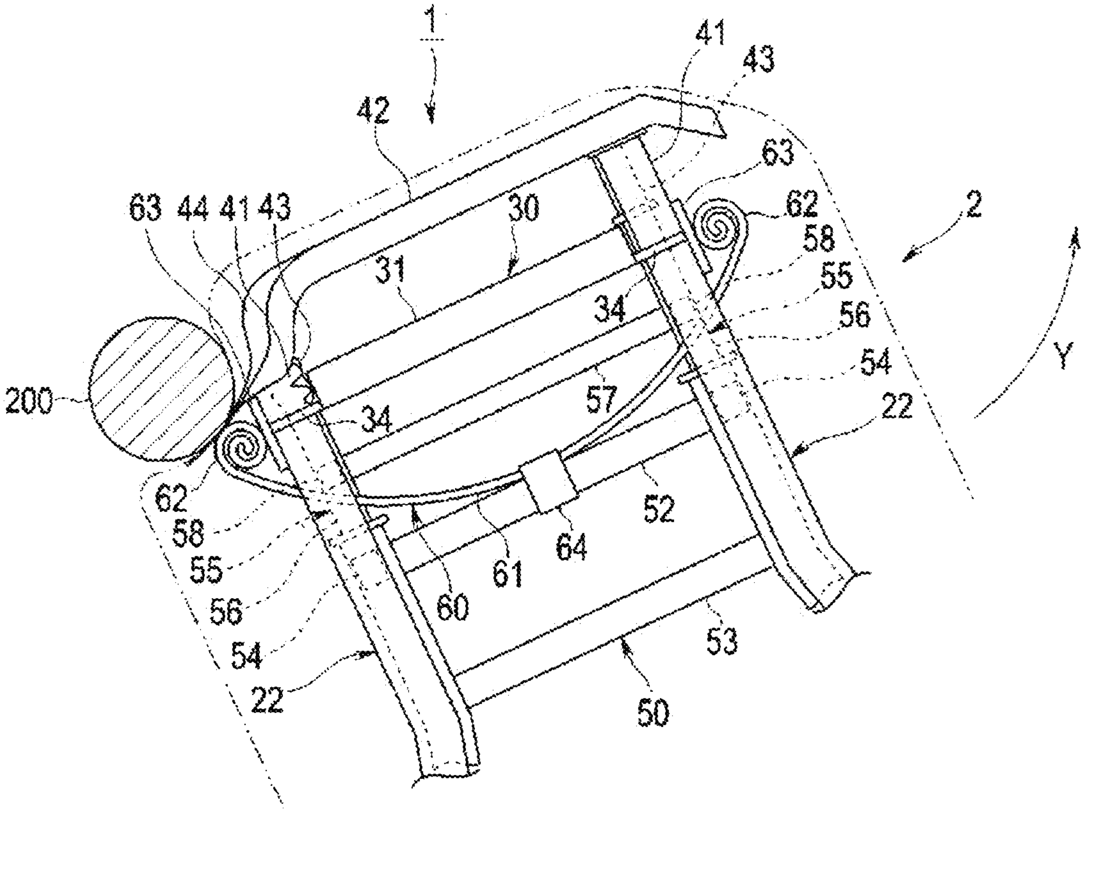
FIG. 11 is a plan view illustrating behavior of the vehicle body structure at a final stage of the small overlap frontal collision.

At a subsequent final stage of the collision, for example, as illustrated in FIG. 11, the obstacle 200 reaches the vicinity of the front end of the front side frame 22. At this time, the bumper beam 42 retreats to the position of the radiator support 30. Then, the rear surface (back surface) of the crushed bumper beam 42 contacts (abuts) the winding portion 62 of the beam member 60.

At this time, the beam member 60 generates a resistance against a collision load input from the obstacle 200 via the bumper beam 42. That is, the beam member 60 is disposed in a spiral shape in which the winding portion 62 has an involute curve outside the front side frame 22 in the vehicle width direction.

Thus, even if the obstacle 200 enters the vehicle body 2 in a state of being displaced outward in the vehicle width direction with respect to the front side frame 22, the beam member 60 transmits a reaction force to the obstacle 200 by resistance of the arc portion 61. That is, when a collision load from the obstacle 200 is input to the beam member 60, the arc portion 61 resists to generate a resistance on the obstacle 200.

Then, in the vehicle 1, a yaw moment for rotating the vehicle body 2 outward in the vehicle width direction is generated by the resistance of the beam member 60 against the collision load from the obstacle 200. That is, the collision load that has not been absorbed by the first crash box 41, the second crash box 43, and the like is converted into a yaw moment for rotating the vehicle body 2 by resistance of the arc portion 61 of the beam member 60.

As illustrated in FIG. 11, for example, when the obstacle 200 collides with the left front portion of the vehicle body 2, a yaw moment in a direction (arrow Y direction) in which the front portion of the vehicle body 2 is rotated to the right is generated in the vehicle body 2. By generating such a yaw moment by the beam member 60, a collision load transmitted from the obstacle 200 to the front side frame 22 and the lower side frame 56 is reduced. Thus, the front portions of the front side frame 22 and the lower side frame 56 are released from the collision load of the obstacle 200 without being greatly deformed.

As described above, the vehicle body front structure of the present embodiment is formed above the cradle extension 55 from the front end of the cradle 50 constituting the frame of the vehicle body 2 to the radiator side frame 32, and includes the beam structure of the beam member 60 in the vehicle body front space in front of the motor room 4.

In the beam member 60, the center portion of the arc portion 61 having an arcuate shape is fixed to the front cross member 52 provided on the front end side of the cradle 5 having the parallel-cross structure. Then, the beam member 60 is disposed in such a manner that the arc portion 61 extends to the front end position of the front side frame 22 joined to the radiator side frame 32 and the bracket 34 of the radiator support 30.

Further, the beam member 60 has, at both ends of the arc portion 61, the winding portions 62 formed into a spiral shape of an involute curve. Each winding portion 62 is joined to the outer surfaces of the radiator side frame 32 and the front side frame 22 with the control plate 63 interposed therebetween. Note that each control plate 63 is fixed to the outer surfaces of the radiator side frame 32 and the front side frame 22 so as to be independently slidable to some extent when being pushed rearward by the collision load at the time of a full-wrap frontal collision.

The cradle 50 is provided in such a manner that a front end position coincides with the front end position of the strut tower 40. Further, in the cradle 50, the arc portion 61 of the beam member 60 is fixed to the front cross member 52 provided at the front end position. Then, in the cradle 50, each lower side frame 51 is joined to the strut tower 40 in order to obtain a reaction force of the beam member 60.

In the beam member 60, the arc portion 61 extends in an upward oblique direction toward the front side frame 22 in the vehicle body front space above the cradle extension 55. In addition, in the beam member 60, the arc portion 61 is disposed around outside the front side frame 22. With such a configuration, at the time of a small overlap frontal collision, the arc portion 61 of the beam member 60 resists to generate a resistance and hence, the beam member becomes a reinforcing member which suppresses deformation of the vehicle body frame such as the front side frame 22 and the cradle 50.

As described above, with the configuration in which the beam member 60 is provided in the vehicle body 2, the vehicle 1 can suppress deformation of the motor room 4 in any collision of the full-wrap frontal collision and the small overlap frontal collision. That is, the beam member 60 provided at the front portion of the vehicle body is a beam structure that is quickly deformed at the time of a full-wrap frontal collision and resists to induce a yawing behavior in the vehicle 1 at the time of the small overlap frontal collision.

The vehicle body front structure according to the present embodiment described above is provided with the beam member 60 that serves as a collision load (energy) absorbing member in the event of a full-wrap frontal collision and serves as a resistance member in the event of the small overlap frontal collision. Thus, the vehicle body front structure can effectively suppress deformation of the power unit room, here, the motor room 4.

Therefore, the vehicle body front structure is configured to be able to suppress deformation of the power unit room in any collision of the full-wrap frontal collision and the small overlap frontal collision.

Note that, although the power unit 45 is an electric vehicle such as a motor in the above embodiment, the embodiment is not limited to this, and even in a vehicle using a power unit such as a reciprocating engine as a drive source, the beam structure of the beam member 60 may be provided as long as the vehicle body front space can be ensured on the front side of the power unit room.

The disclosure described in the above-described embodiment is not limited to the embodiment. In the stage of implementation, various modifications can be implemented within the scope not departing from the idea of the disclosure. Further, the above-described embodiment includes disclosures in various stages. Various disclosures can be extracted from appropriate combinations of the disclosed multiple components.

Further, for example, even though some components are deleted from all the components described in the embodiment, the configuration from which the components are deleted can be extracted as a disclosure as long as the described problem can be solved and the described effect can be obtained.

The invention claimed is:

1. A vehicle body front structure comprising:

a cradle that is disposed below a power unit room disposed in a front portion of a vehicle body and supports a power unit;

front side frames in a pair extending in a front-rear direction of the vehicle body on a side portion of the power unit room;

a radiator support provided in front of the power unit room and joining a front end of each of the front side frames to a radiator side frame;

a control plate joined to an outer surface of the front end of each of the front side frames and the radiator side frame; and a beam member disposed in a vehicle body front space formed between the power unit room and the radiator support, the beam member comprising an arc portion comprising a center portion fixed to the cradle, and a winding portion joined to the control plate and provided at each of both ends of the arc portion.

2. The vehicle body front structure according to claim 1, wherein the winding portion has a spiral shape having an involute curve.

3. The vehicle body front structure according to claim 1, wherein the arc portion is disposed around outside the front side frames.

4. The vehicle body front structure according to claim 2, wherein the arc portion is disposed around outside the front side frames.

5. The vehicle body front structure according to claim 1, wherein the control plate is joined to the front side frames and the radiator side frame in such a manner as to be slidable to rearward of the front side frames and the radiator side frame.

6. The vehicle body front structure according to claim 1, further comprising:

strut towers in a pair to which suspensions are fixed, wherein the cradle has a front end position coinciding with respective front end positions of the strut towers, and is joined to the strut towers.

* * * * *